United States Patent [19]

Il Yoo

[11] Patent Number: 4,978,375
[45] Date of Patent: Dec. 18, 1990

[54] PLASTIC AIR FILTER HOUSING ASSEMBLY FOR USE IN AIR CONDITIONERS AND HEATING SYSTEMS

[75] Inventor: Kim Il Yoo, Alexandria, Va.

[73] Assignee: Permanent Solution Industries, Inc., Falls Church, Va.

[21] Appl. No.: 459,241

[22] Filed: Dec. 29, 1989

[51] Int. Cl.$^5$ ............................................. B01D 46/00
[52] U.S. Cl. ........................................ 55/493; 55/483; 55/504; 55/516; 55/DIG. 31
[58] Field of Search ................. 55/483, 493, 503, 504, 55/516–519, DIG. 31

[56] References Cited

U.S. PATENT DOCUMENTS

| | | | |
|---|---|---|---|
| 2,677,436 | 5/1954 | Mazek | 55/DIG. 31 X |
| 3,430,771 | 3/1969 | Drehen | 55/483 X |
| 3,778,985 | 12/1973 | Daigle et al. | 55/493 |

Primary Examiner—Charles Hart
Attorney, Agent, or Firm—Birch, Stewart, Kolasch & Birch

[57] ABSTRACT

A plastic air filter housing assembly for use in air conditioning and heating systems which includes a base member having a pair of round shape longitudinal upper and lower edges and a plurality of transverse frames having a plurality of longitudinally frames to be cross located therewith connecting member and a locking member respectively for pivotally connecting to and slidably locking with the edges respectively, whereby the air filter housing assembly is easily assembled its components and easily replacing the air filter in the air filter housing assembly.

4 Claims, 1 Drawing Sheet

U.S. Patent
Dec. 18, 1990
4,978,375
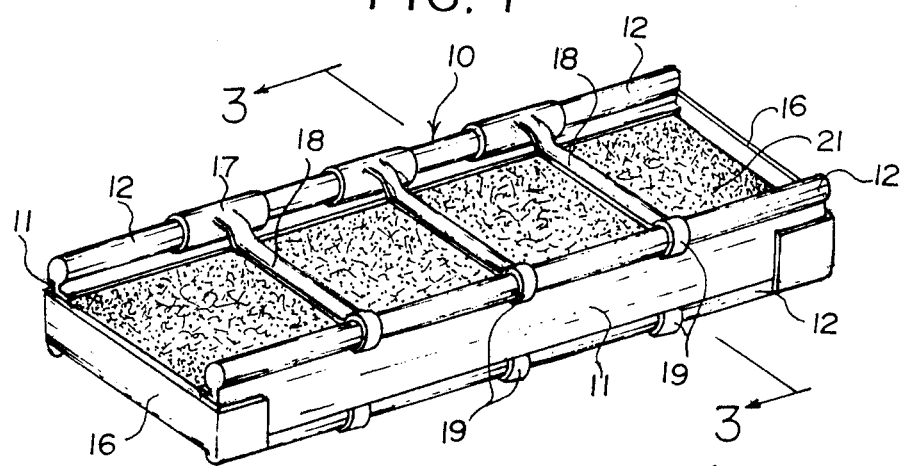
FIG. 1
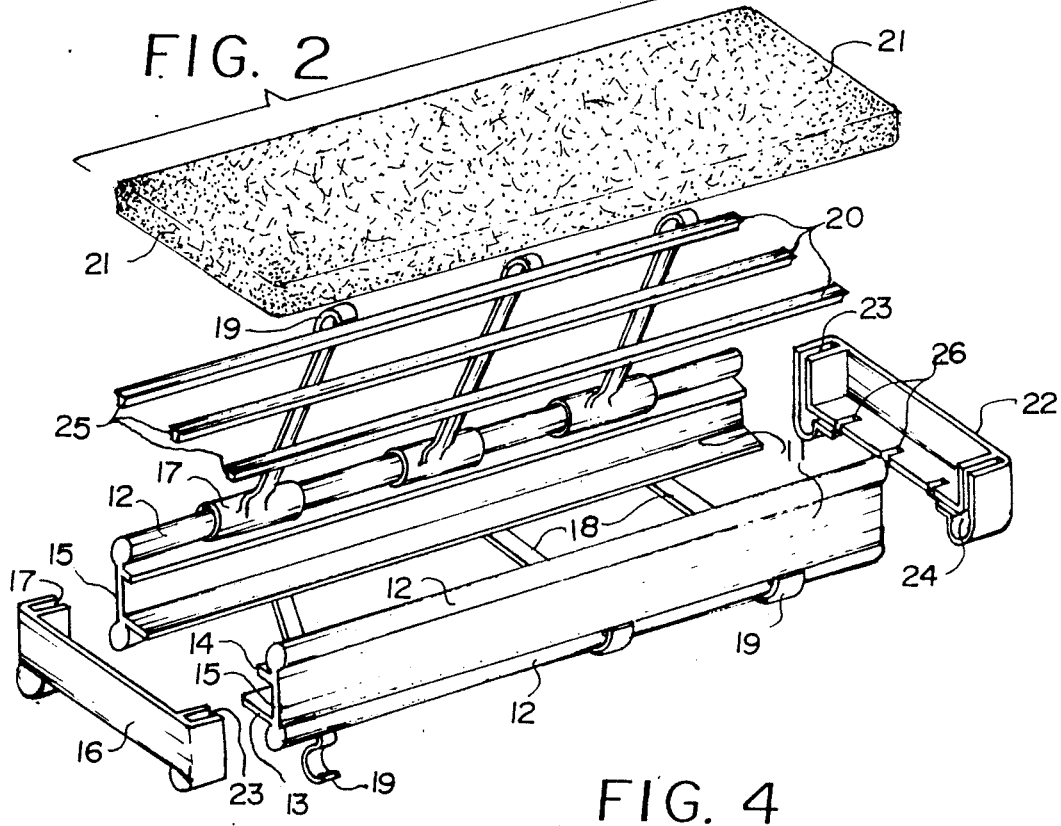
FIG. 2
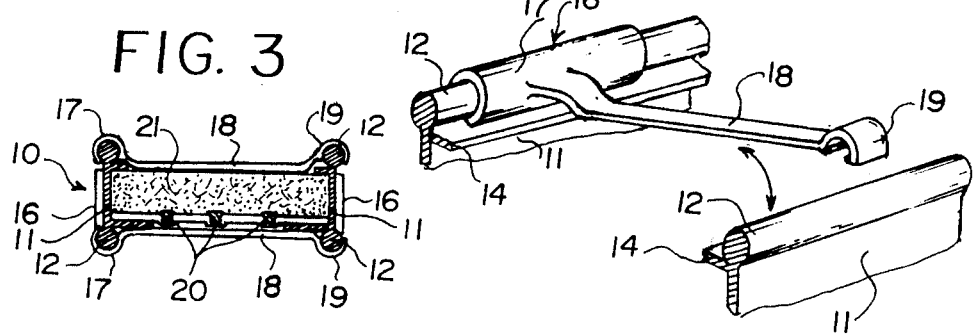
FIG. 3
FIG. 4

PLASTIC AIR FILTER HOUSING ASSEMBLY FOR USE IN AIR CONDITIONERS AND HEATING SYSTEMS

BACKGROUND OF THE INVENTION

1. Field of the Invention

The present invention relates to an air filter housing assembly for use in conjunction with air conditioning installations and refrigeration systems and more particularly, to an air filter housing assembly assembled with a base member and a plurality of pivotal transverse frames having a plurality of longitudinal frames cross located therewith which is mounted to air conditioners and heating systems.

2. Description of the Prior Art

Air filter housing devices are generally known to be utilized with air conditioning systems. Conventional devices utilize a net type housing made of steel which is directly mounted to an air conditioners and a heating system. However, these devices suffer from a number of problems such as, for example, the problem that metal air filter housing devices eventually become rusted and heavy weight. Further, it is difficult for the housing devices to replace the air filter because of the heavy weight caused by the metal housing and no open/close member so that the housing devices cannot be easily handled for a short time. It is also very difficult for the air filter to insert into and remove from such housing devices because the heavy housing devices have to take out of the air conditioners and heating systems.

SUMMARY OF THE INVENTION

Accordingly, it is an object of the present invention to provide an improved plastic air filter housing assembly for use in air conditioning systems and refrigerators.

Another object of the present invention is to provide a plastic air filter housing device which is structured for easily inserting and removing an air filter into and from the air filter housing devices in conjunction with the conditioning and heating systems.

Still another object of the present invention is to provide an air conditioning system which includes an plastic air filter housing assembly for easily inserting an air filter to the plastic filter housing assembly which has a plurality of locking and releasing members.

Yet another object of the present invention is to provide an improved air filter housing assembly for utilizing to a specific air conditioning system having a narrow width thereof.

A further object of the present invention is to provide an improved plastic air filter housing assembly for smoothly mounting to and easily separating from an air conditioning system which includes a pair of longitudinal base members having a pair of first and second round shape longitudinal upper and lower edges and a pair of shelves respectively, a pair of transverse base members having a plurality of triangular grooves respectively, a plurality of longitudinal frames having a triangular configuration at the lower portion thereof respectively for engaging with the triangular grooves, a plurality of transverse frames to be cross located with the longitudinal frames and having a round shape connecting member at one end respectively for pivotably connecting to the first round shape edge and a hook type locking member at the other end thereof respectively for easily locking to and releasing from the second round shape edge, and an air filter for slidably inserting into and removing from the plastic air filter housing assembly and effectively retaining the air filter against the air steam from the air conditioning system.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a plastic air filter housing assembly for use in air conditioning and heating systems which includes a base member having a pair of round shape longitudinal upper and lower edges and a plurality of transverse frames having a plurality of longitudinal frames to be cross located therewith connecting member and a locking member respectively for pivotably connecting to and slidably locking with the edges respectively, whereby the air filter housing assembly is easily assembled its components and easily replacing the air filter in the air filter housing assembly.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a perspective view of a plastic air filter housing assembly in its turnover position;

FIG. 2 is an exploded perspective view of FIG. 1 showing basic components of the plastic air filter housing assembly of the present invention;

FIG. 3 is a cross-sectional view of FIG. 1, taken along line 3—3; and

FIG. 4 is a perspective view showing connecting and locking members of a transverse frame and round shape upper edges of a longitudinal of plastic air filter assembly of the present invention.

DESCRIPTION OF THE PREFERRED EMBODIMENTS

Referring now in detail to the drawings for the purpose of illustrating preferred embodiments of the present invention, the plastic air filter housing assembly 10 as shown in FIGS. 1 and 2 includes a pair of longitudinal base member 11 having a plurality of transverse frames 16 with a plurality of longitudinal frames 20 and a pair of transverse base members 22 assembled with the pair of longitudinal base members 11 for forming a rectangular housing for containing an air filter 21. The pair of longitudinal base member 11 includes a pair of round shape longitudinal upper and lower edges 12, a pair of small and large shelves 14 and 13 disposed between the upper of lower edges 12, and a pair of vertical stands 15 disposed between the small and large shelves 14 and 13 respectively for inserting the air filter 21 into a space defined by the small and large shelves 14 and 13. The pair of transverse base member 22 includes a pair of vertical slots 23 and a pair of round shape slots 24 for tightly receiving the pair of vertical stands 15 and the pair of edges 12 of the longitudinal base member 11 for forming the rectangular air filter housing as shown in FIG. 1, and a plurality of triangular grooves 26.

The plurality of transverse frames 16 provided with a plurality of longitudinal frames 20 to be cross located therewith includes a round shape connecting member 17 for pivotably engaging with the first round shape edge 12, a hook type locking member 19 for slidably locking to and separating from second round edge 12, and an u-shaped pushing rod 18 for pushing the air filter 21 so as to retain the air filter 21 from the air steam from the air conditioning system respectively (FIGS. 3 and 4). The plurality of longitudinal frames 20 has a triangular configuration portion 25 disposed in the lower portion thereof for tightly engaging with and easily removing from the triangular grooves 26 of the transverse base members 22.

In assembly, the plurality of transverse frames 16 are pivotably attached to the first upper and lower edges 12 through the round shape connecting member 17 of the transverse frames 16. At this time, an amount of transverse frames 16 about the length of the longitudinal base member 11 can determine if necessary. That is, for example, under the strong air steam, many transverse frames 16 require for retaining the air filter 21. Thereafter, the pair of transverse base members 22 are attached to both ends of the pair of longitudinal base members 11 through the pair of vertical slots 23 and round shape slots 24 respectively. And the plurality of longitudinal frames 20 are tightly engaged with the plurality of triangular grooves 26 of the transverse base member 22 through the triangular configuration portion 25 of the longitudinal frames 20. Thereafter, the connecting members 16 pivotably engaged with the first upper edge 12 are locked to the second upper edge 12 so as to cross located with the longitudinal frames 20. And then the air filter 21 is inserted into the space defined between the large and small shelves 13 and 14 in the air filter housing assembly 10. Lastly, the transverse frames 15 are locked to the second lower edge 12 to form the complete air filter housing assembly (FIGS. 1 and 3).

In utilizing, the air filter housing assembly 10 as shown in FIG. 1 is turned over for use in conjunction with the air conditioning and heating systems.

In replacing for the air filter 21, the used air filter housing assembly is taken out from the air conditioning and heating systems and turned over as shown in FIG. 1. Thereafter, after releasing the locking member 19 from the second lower edge 12, the used air filter 21 can be easily replaced for a new air filter and in turn, the air filter replaced filter housing assembly 10 can easily be assembled with the air conditioning and heating systems.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. An air filter housing assembly containing an air filter for use in conjunction with air conditioning and heating system which comprises:

first and second plastic longitudinal base members including a pair of longitudinal upper and lower edges, a back, and a pair of shelves extended from said back, respectively, a pair of plastic transverse base members including a pair of vertical slots and round shape slots extended from said vertical slots for tightly receiving both ends of the longitudinal base members, said pair of plastic transverse base members further including a plurality of grooves, respectively, a plurality of plastic transverse frames including a pivotal round shape connecting member disposed at one end thereof for slidably engaging with said first longitudinal upper end lower edges, a hook type locking member disposed at the other end thereof for slidably engaging with and separating from said second longitudinal upper and lower edges, and a downward pushing rod portion for pushing the air filter so as to retain the air filter in the air filter assembly, and a plurality of longitudinal frames to be cross located to said transverse frames pivotably attached to said upper edge, said plurality of longitudinal frames including an engaging portion disposed at the lower portion thereof for tightly engaging in said grooves of the transverse base member, respectively, whereby the air filter housing assembly can be easily assembled and disassembled and the air filter can be easily inserted into and removed from the air filter housing assembly.

2. The air filter housing assembly of claim 1, wherein the pair of shelves are small and large wherein the large shelves are in the vicinity of said upper edges.

3. The air filter housing assembly of claim 2, wherein the pair of shelves defines a space disposed therebetween for slidably receiving the air filter.

4. The air filter housing assembly or claim 1, wherein the grooves of the transverse base member have a triangular configuration for tightly mating with triangular configurated engaging portions of the longitudinal frames.

* * * * *